United States Patent
Ha et al.

(10) Patent No.: US 10,563,885 B2
(45) Date of Patent: Feb. 18, 2020

(54) AIR CONDITIONING DEVICE AND METHOD FOR CALCULATING AMOUNT OF DEHUMIDIFICATION THEREOF

(71) Applicant: SAMSUNG ELECTRONICS CO., LTD., Suwon-si (KR)

(72) Inventors: Jong-kweon Ha, Suwon-si (KR); Hee-chan Kang, Suwon-si (KR); Seok-kyun Kim, Hwaseong-si (KR); Kwon-jin Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 267 days.

(21) Appl. No.: 15/605,295

(22) Filed: May 25, 2017

(65) Prior Publication Data

US 2018/0023831 A1    Jan. 25, 2018

(30) Foreign Application Priority Data

Jul. 25, 2016    (KR) .................. 10-2016-0094369

(51) Int. Cl.
*F24F 11/62*    (2018.01)
*F24F 11/63*    (2018.01)
(Continued)

(52) U.S. Cl.
CPC ............ *F24F 11/62* (2018.01); *F24F 3/1405* (2013.01); *F24F 11/30* (2018.01); *F24F 11/52* (2018.01);
(Continued)

(58) Field of Classification Search
CPC .. F24F 11/62; F24F 11/63; F24F 11/30; F24F 11/52; F24F 3/1405; F24F 11/64;
(Continued)

(56) References Cited

U.S. PATENT DOCUMENTS 4,175,418 A * 11/1979 Steffen .................... A01F 25/08
                                                           374/112
4,942,740 A *  7/1990 Shaw ..................... F24F 3/1405
                                                           165/297
(Continued)

FOREIGN PATENT DOCUMENTS

CN    104990227 A    10/2015
CN    105115212 A    12/2015
(Continued)

OTHER PUBLICATIONS

M.M. Bassuoni, "A simple analytical method to estimate all exit parameters of a cross-flow air dehumidifier using liquid desiccant", available Dec. 16, 2012, Journal of Advanced Research (2014) 5, 175-182. (Year: 2012).*

(Continued)

*Primary Examiner* — Brian W Wathen
*Assistant Examiner* — Kelvin Booker
(74) *Attorney, Agent, or Firm* — Staas & Halsey LLP

(57) ABSTRACT

An air conditioning device is provided. The air conditioning device includes: a sensor configured to sense a driving state of the air conditioning device and ambient air information of the air conditioning device; a processor configured to calculate temperature and humidity information of discharged air on the basis of the information sensed by the sensor, and calculate an amount of dehumidification on the basis of the calculated temperature and humidity information; and a display configured to provide the calculated amount of dehumidification.

10 Claims, 12 Drawing Sheets

(51) Int. Cl.
| | |
|---|---|
| *F24F 11/30* | (2018.01) |
| *G05B 19/04* | (2006.01) |
| *F24F 11/52* | (2018.01) |
| *F24F 3/14* | (2006.01) |
| *G05B 19/048* | (2006.01) |
| *F24F 110/20* | (2018.01) |
| *F24F 11/64* | (2018.01) |
| *F24F 110/22* | (2018.01) |
| *F24F 110/10* | (2018.01) |

(52) U.S. Cl.
CPC ............ F24F 11/63 (2018.01); G05B 19/048 (2013.01); *F24F 11/64* (2018.01); *F24F 2110/10* (2018.01); *F24F 2110/20* (2018.01); *F24F 2110/22* (2018.01); *G05B 2219/2614* (2013.01)

(58) Field of Classification Search
CPC ............ F24F 2110/20; F24F 2110/22; F24F 2110/10; G05B 19/042; G05B 15/02; G05B 19/048; G05B 2219/2638; G05B 2219/2642; G05B 2219/2614
See application file for complete search history.

(56) References Cited

U.S. PATENT DOCUMENTS

| | | | | |
|---|---|---|---|---|
| 5,004,483 | A * | 4/1991 | Eller | B08B 15/026 134/111 |
| 5,170,635 | A * | 12/1992 | Wruck | F24F 3/06 62/140 |
| 5,368,786 | A * | 11/1994 | Dinauer | B01D 53/268 128/203.12 |
| 6,012,296 | A * | 1/2000 | Shah | F24F 11/0008 62/173 |
| 6,070,110 | A * | 5/2000 | Shah | F24F 11/0008 165/205 |
| 6,223,543 | B1 * | 5/2001 | Sandelman | F24F 11/0008 62/93 |
| 6,269,650 | B1 * | 8/2001 | Shaw | F24F 11/83 62/176.6 |
| 7,024,799 | B2 * | 4/2006 | Perret | F26B 21/06 34/212 |
| 8,290,742 | B2 * | 10/2012 | Burton | F24F 3/14 702/182 |
| 9,879,874 | B2 | 1/2018 | Motodani et al. | |
| 2002/0113132 | A1 * | 8/2002 | Shah | F24F 11/0008 236/44 R |
| 2006/0026976 | A1 * | 2/2006 | Carpenter | F24F 3/153 62/176.1 |
| 2008/0315000 | A1 * | 12/2008 | Gorthala | B60H 1/00785 236/46 C |
| 2010/0269526 | A1 * | 10/2010 | Pendergrass | F24F 11/0008 62/186 |
| 2010/0298989 | A1 * | 11/2010 | Hess | H01R 13/6456 700/276 |
| 2011/0168793 | A1 * | 7/2011 | Kreft | F24F 3/14 236/44 C |
| 2011/0172831 | A1 * | 7/2011 | Kreft | F24F 3/044 700/278 |
| 2012/0047930 | A1 * | 3/2012 | Uselton | F24D 11/0242 62/176.6 |
| 2013/0087630 | A1 * | 4/2013 | Castillo | F24F 11/0008 236/44 C |
| 2014/0190198 | A1 * | 7/2014 | Slessman | H05K 7/20745 62/314 |
| 2014/0202190 | A1 * | 7/2014 | Matsui | F24F 3/1405 62/271 |
| 2015/0337831 | A1 * | 11/2015 | Zhou | F04B 49/20 700/276 |
| 2016/0054018 | A1 | 2/2016 | Motodani et al. | |
| 2017/0234564 | A1 * | 8/2017 | Goel | F25B 49/02 62/93 |
| 2018/0100668 | A1 * | 4/2018 | Huang | F24F 13/30 |
| 2019/0277513 | A1 * | 9/2019 | Jung | F24F 13/10 |

FOREIGN PATENT DOCUMENTS

| | | |
|---|---|---|
| CN | 105143780 A | 12/2015 |
| CN | 105445047 A | 3/2016 |
| EP | 1 022 521 A1 | 7/2000 |
| EP | 1 022 521 A4 | 9/2001 |
| EP | 1443279 B1 | 4/2007 |
| JP | 2002-349934 | 12/2002 |
| JP | 2005-214482 | 8/2005 |
| JP | 2007-263425 A | 10/2007 |
| JP | 2008-20113 | 1/2008 |
| JP | 2008-67996 | 3/2008 |
| JP | 4280994 B2 | 6/2009 |
| JP | 4844498 B2 | 12/2011 |
| KR | 10-2006-0011465 | 2/2006 |
| KR | 10-0557043 B1 | 3/2006 |
| KR | 10-2015-0048373 A | 5/2015 |
| KR | 10-2016-0013479 A | 2/2016 |
| KR | 10-2016-0023112 A | 3/2016 |

OTHER PUBLICATIONS

Bryan R. Becker, Ph.D., P.E., Brian A. Fricke, Ph.D., Bryan C. Sartin, "AHRTI Report No. 09002-01, Performance Standards for Walk-In Refrigerator and Freezer Systems, Final Report", Jan. 2012, Air-Conditioning, Heating and Refrigeration Technology Institute, Inc. (Year: 2012).*
T.H. Kuehn and J.W. Ramsey, "ME 4131, Thermal Environmental Engineering", Spring 2009, University of Minnesota. (Year: 2009).*
D. B. Shirey, III, H. I. Henderson, Jr. and R. A. Raustad, Understanding the Dehumidification Performance of Air-Conditioning Equipment at Part-Load Conditions, Jan. 2006, University of Central Florida/Florida Solar Energy Center, DOE/NETL Project No. DE-FC26-01NT41253. (Year: 2006).*
"Study on Simulation and Optimization of Dehumidification Process", Engineering Science and Technology Series II, No. 03, Mar. 15, 2016, pp. 41-44.
"Analysis of Influence of Air Volume on Dehumidification of Low Temperature Dehumidifier", Fluid Machinery, vol. 30, supplement, 2002, pp. 255-257.
Chinese Office Action dated Jul. 15, 2019 in corresponding Chinese Patent Application No. 201710560905.8.

* cited by examiner

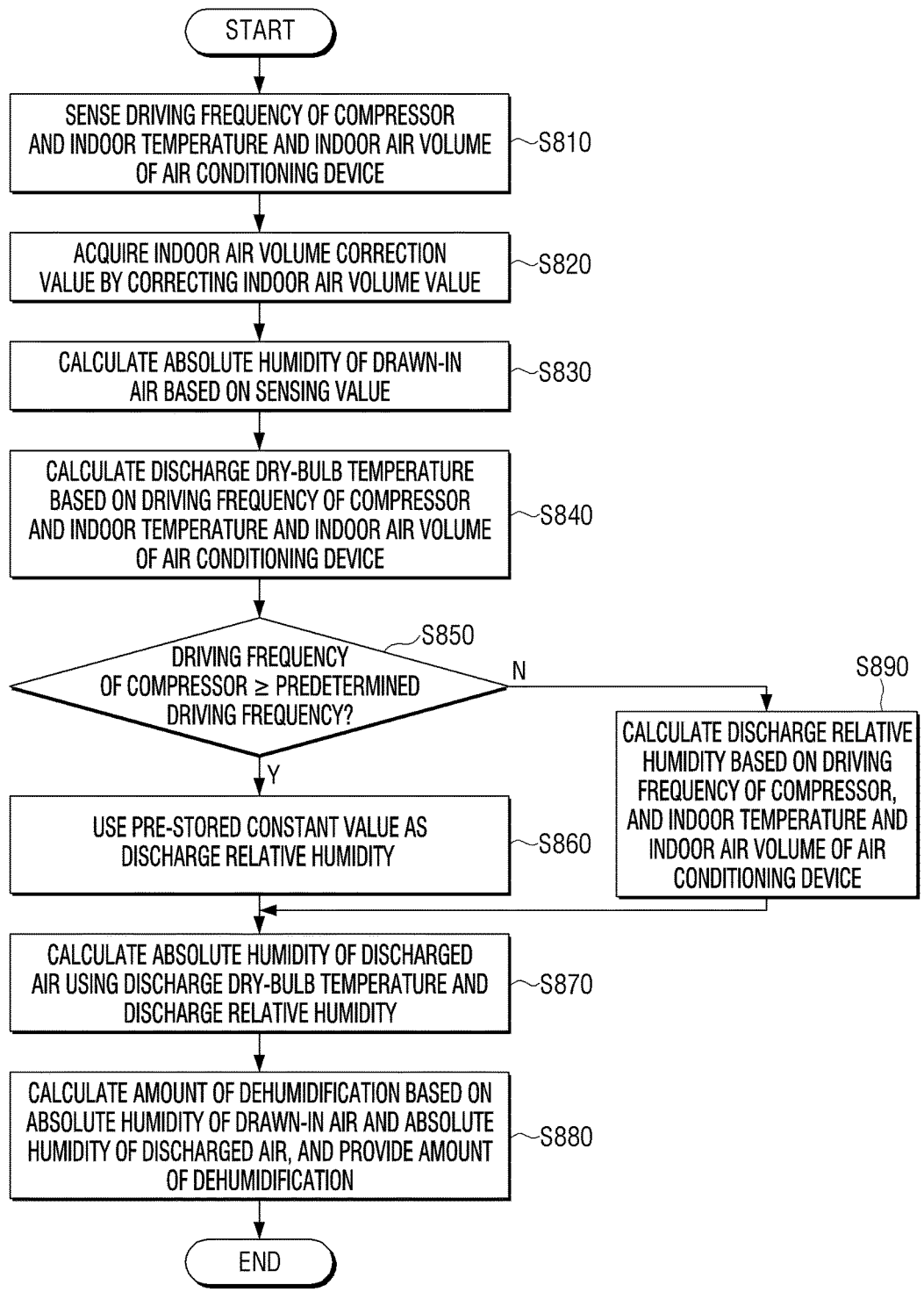

AIR CONDITIONING DEVICE AND METHOD FOR CALCULATING AMOUNT OF DEHUMIDIFICATION THEREOF

CROSS-REFERENCE TO RELATED APPLICATIONS

This application claims priority from Korean Patent Application No. 10-2016-0094369, filed on Jul. 25, 2016, in the Korean Intellectual Property Office, the disclosure of which is incorporated herein by reference in its entirety.

BACKGROUND OF THE INVENTION

Field of the Invention

Apparatuses and methods consistent with exemplary embodiments relate to an air conditioning device which displays an amount of dehumidification and a method for calculating an amount of dehumidification thereof.

Description of the Related Art

In recent years, many households and offices are increasingly provided with air conditioning devices including a dehumidification function, such as air conditioners or dehumidifiers, in order to maintain a fresh indoor environment. In general, the dehumidifier is a device which includes a compressor, a heat exchanger, and a fan, and draws in and removes moisture of indoor humid air and then discharges the air.

A related-art air conditioning device provides only current indoor humidity and target humidity to a user, and accordingly, there is a problem that the user cannot know how much the air conditioning device reduces indoor humidity, that is, a specific amount of dehumidification of the air conditioning device.

To solve this problem, some of the air conditioning devices measure an amount of dehumidification by sensing condensate water flowing through a heat exchanger through a sensor. However, when the condensate water is contained in a separate space and the amount of dehumidification is measured, there are problems of contamination, smell, generation of microorganism, an increased manufacturing cost, and an increased volume of the air conditioning device.

SUMMARY OF THE INVENTION

One or more exemplary embodiments may overcome the above disadvantages and other disadvantages not described above. However, it is understood that one or more exemplary embodiment are not required to overcome the disadvantages described above, and may not overcome any of the problems described above.

One or more exemplary embodiments provide an air conditioning device which can calculate instant and cumulative amounts of dehumidification through an algorithm without having to contain condensate water in a separate space and, and display the calculated amount of dehumidification, and a method for calculating an amount of dehumidification thereof.

According to an aspect of an exemplary embodiment, there is provided an air conditioning device, including: a sensor configured to sense a driving state of the air conditioning device and ambient air information of the air conditioning device; a processor configured to calculate temperature and humidity information of discharged air on the basis of the information sensed by the sensor, and calculate an amount of dehumidification on the basis of the calculated temperature and humidity information; and a display configured to provide the calculated amount of dehumidification.

The air conditioning device may further include a suction portion configured to draw air into the air conditioning device, and the processor may be configured to calculate absolute humidity of the air drawn-in through the suction portion on the basis of the ambient air information sensed by the sensor, and calculate the amount of dehumidification on the basis of the calculated absolute humidity of the drawn-in air and the temperature and humidity information of the discharged air.

The driving state of the air conditioning device may include driving frequency information of a refrigerant compressor provided in the air conditioning device, and the ambient air information may include indoor temperature information of a place where the air conditioning device is placed, and indoor air volume information of the place where the air conditioning device is placed.

The air conditioning device may further include a storage configured to store data related to an indoor air volume correction value, and the processor may be configured to acquire, from the storage, an indoor air volume correction value corresponding to the indoor air volume information, and calculate a dry-bulb temperature and relative humidity information of the discharged air on the basis of the acquired indoor air volume correction value, the driving frequency information of the refrigerant compressor, and the indoor temperature information of the place where the air conditioning device is placed.

The processor may be configured to calculate the amount of dehumidification on the basis of the dry-bulb temperature of the discharged air, the relative humidity of the discharged air, and the absolute humidity of the drawn-in air.

The processor may be configured to calculate the amount of dehumidification on the basis of the following equation:

$$\text{amount of dehumidification} = (X1 - X2) * \text{mass flow rate}$$

where $X1$ (kg/kgDA) is absolute humidity of drawn-in air and $X2$ (kg/kgDA) is absolute humidity of discharged air.

In response to the driving frequency of the refrigerant compressor being greater than or equal to a predetermined value, the processor may be configured to calculate the amount of dehumidification by using a pre-stored constant value as the relative humidity information of the discharged air.

The processor may be configured to provide, through the display, at least one of an instantaneous amount of dehumidification based on the calculated amount of dehumidification and a cumulative amount of dehumidification acquired by accumulating the instantaneous amounts of dehumidification.

According to another aspect of an exemplary embodiment, there is provided a method for calculating an amount of dehumidification of an air conditioning device, the method including: sensing a driving state of the air conditioning device and ambient air information of the air conditioning device; calculating temperature and humidity information of discharged air on the basis of the sensed information; calculating an amount of dehumidification on the basis of the calculated temperature and humidity information; and providing the calculated amount of dehumidification.

The method may further include drawing air into the air conditioning device, and the calculating the amount of dehumidification may include calculating absolute humidity of the drawn-in air on the basis of the sensed ambient air information, and calculating the amount of dehumidification on the basis of the calculated absolute humidity of the drawn-in air and the temperature and humidity information of the discharged air.

The driving state of the air conditioning device may include driving frequency information of a refrigerant compressor provided in the air conditioning device, and the ambient air information may include indoor temperature information of a place where the air conditioning device is placed, and indoor air volume information of the place where the air conditioning device is placed.

The calculating the amount of dehumidification may include acquiring an indoor air volume correction value corresponding to the indoor air volume information, and calculating a dry-bulb temperature and relative humidity information of the discharged air on the basis of the acquired indoor air volume correction value, the driving frequency information of the refrigerant compressor, and the indoor temperature information of the place where the air conditioning device is placed.

The calculating the amount of dehumidification may include calculating the amount of dehumidification on the basis of the dry-bulb temperature of the discharged air, the relative humidity of the discharged air, and the absolute humidity of the drawn-in air.

The calculating the amount of dehumidification may include calculating the amount of dehumidification on the basis of the following equation:

$$\text{amount of dehumidification} = (X1 - X2) * \text{mass flow rate}$$

where X1 (kg/kgDA) is absolute humidity of drawn-in air and X2 (kg/kgDA) is absolute humidity of discharged air.

The calculating the amount of dehumidification may include, in response to the driving frequency of the refrigerant compressor being greater than or equal to a predetermined value, calculating the amount of dehumidification by using a pre-stored constant value as the relative humidity information of the discharged air.

The providing the calculated amount of dehumidification may include providing at least one of an instantaneous amount of dehumidification based on the calculated amount of dehumidification and a cumulative amount of dehumidification acquired by accumulating the instantaneous amounts of dehumidification.

According to various exemplary embodiments, the air conditioning device can calculate and display a specific amount of dehumidification through a predetermined algorithm, and is not required to provide a separate space for containing condensate water. Accordingly, since the volume of the air conditioning device can be reduced and the cost can be reduced, user's convenience can be enhanced.

Additional and/or other aspects and advantages of the invention will be set forth in part in the description which follows and, in part, will be obvious from the description, or may be learned by practice of the invention.

BRIEF DESCRIPTION OF THE DRAWING FIGURES

The above and/or other aspects of the present disclosure will be more apparent by describing certain exemplary embodiments of the present disclosure with reference to the accompanying drawings, in which:

FIG. 8 is a flowchart showing a method for calculating an amount of dehumidification according to an exemplary embodiment.

DETAILED DESCRIPTION OF THE EXEMPLARY EMBODIMENTS

Hereinafter, various exemplary embodiments will be described in detail with reference to the accompanying drawings.

Figure 1A:
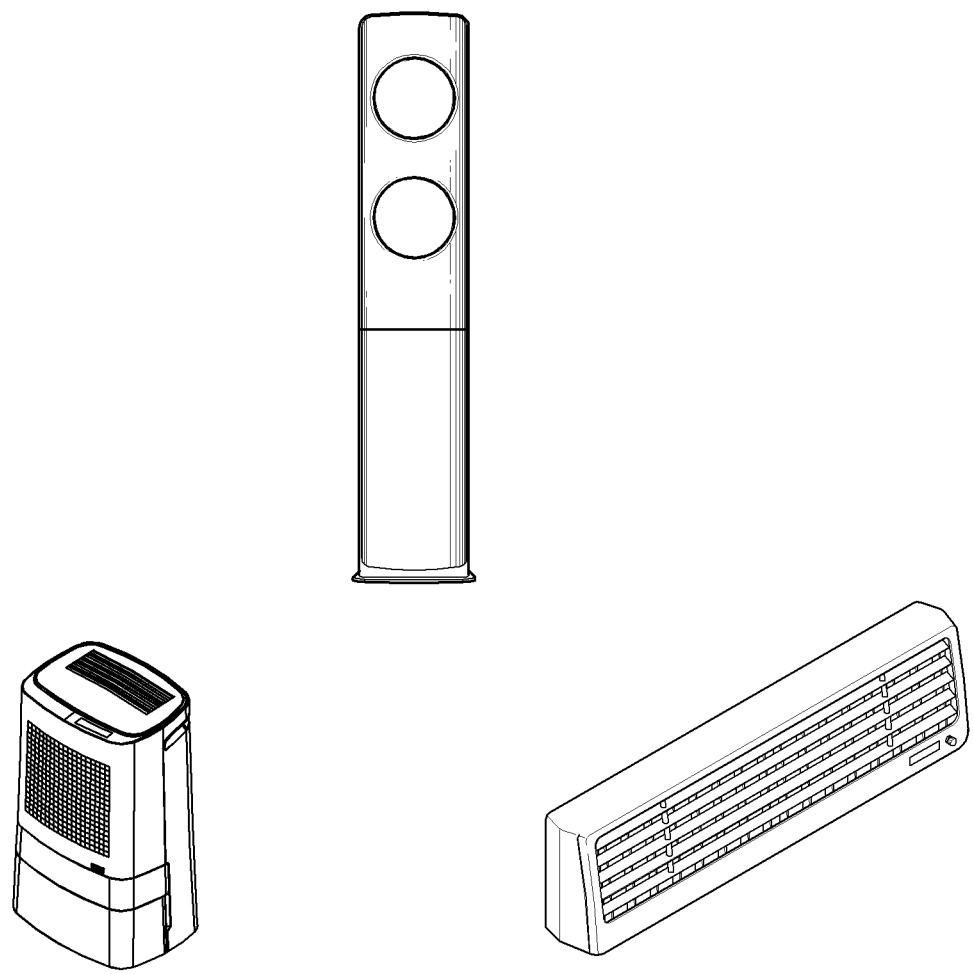
FIGS. 1A to 1C are views to illustrate an air conditioning device 100 according to an exemplary embodiment.
Figure 1B:
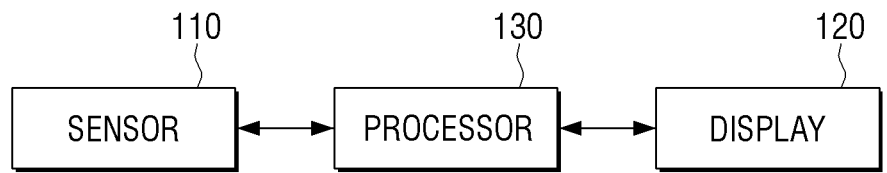
Figure 1C:
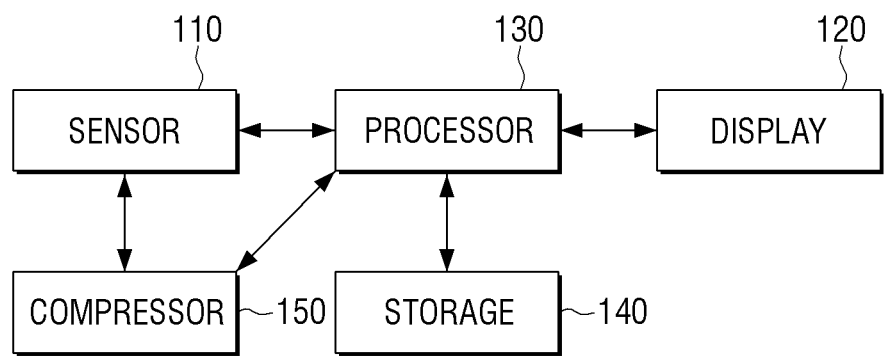

FIGS. 1A to 1C are views to illustrate an air conditioning device 100 according to an exemplary embodiment.

FIG. 1A is a view to illustrate an implementation example of the air conditioning device according to an exemplary embodiment.

Referring to FIG. 1A, the air conditioning device 100 may be implemented by using an air conditioner, a dehumidifier, a fan, or the like which is able to condition air. However, this should not be considered as limiting and the air conditioning device 100 may be implemented by using any device which cleans indoor air and cools/dehumidifies or heats/humidifies. Hereinafter, however, the present disclosure will be described on the assumption that the air conditioning device 100 is implemented by using a dehumidifier for convenience of explanation.

When the air conditioning device 100 is implemented by using a dehumidifier, the dehumidifier draws in indoor air through a suction port, and cools the drawn-in air by exchanging heat, that is, by having heat lost by an evaporator, when the air passes through the evaporator or a condenser. Accordingly, humidity in the air saturates on the surface of the evaporator and thus condensate water forms thereon and is then contained in a water tank. In addition, as the air which is dried when it passes through the evaporator is discharged back to a room through a discharge unit, the dehumidification is finished.

The air conditioning device 100 which performs such a dehumidification function according to an exemplary embodiment may calculate an amount of dehumidification on the basis of a driving state of the air conditioning device 100 and ambient air information of the air conditioning device 100, and may display the calculated amount of dehumidification. Various exemplary embodiments will be described with reference to the block diagram showing a detailed configuration of the air conditioning device 100.

FIG. 1B is a block diagram showing a configuration of the air conditioning device according to an exemplary embodiment.

Referring to FIG. 1B, the air conditioning device 100 according to an exemplary embodiment includes a sensor 110, a display 120, a processor 130.

The sensor 110 may sense the driving state of the air conditioning device 100 and the ambient air information of the air conditioning device 100. Herein, the driving state of the air conditioning device 100 is an overall driving state of the air conditioning device 100 and may be, but not limited to, information regarding a driving frequency of a refrigerant compressor, an evaporator, a condenser, an amount of refrigerant, a pipe length, and an air circulation fan.

The ambient air information of the air conditioning device 100 is information regarding indoor air of a place where the air conditioning device 100 is located, and may include, but not limited to, a variety of information such as an indoor temperature, indoor relative humidity, and an indoor air volume. The sensor 110 may be provided on the exterior of the air conditioning device 100 or may be provided inside the air conditioning device 100. The sensor 110 may be provided in an indoor air suction portion of the air conditioning device 100. Accordingly, the sensor 110 may sense the relative humidity and the dry-bulb temperature of drawn-in air. In addition, the air conditioning device 100 may be provided with only one sensor 110 or may be provided with a plurality of sensors 110 according to a purpose of sensing.

The sensor 110 may integrally or individually include an air temperature sensor (not shown) to sense the temperature of the drawn-in air, a wind velocity sensor (not shown) to sense an indoor wind velocity, and a humidity sensor (not shown) to sense indoor humidity or humidity of the drawn-in air.

The processor 130 controls an overall operation of the air conditioning device 100. Herein, the processor 130 may include one or more of a central processing unit (CPU), a controller, an application processor (AP), a communication processor (CP), and an ARM processor.

The processor 130 may be connected to the above-described sensor 110 to receive the driving state of the air conditioning device 100 and the ambient air information of the air conditioning device 100 which are sensed by the sensor 110.

The processor 130 may calculate absolute humidity of the drawn-in air on the basis of the dry-bulb temperature and the relative humidity of the drawn-in air out of the ambient air information sensed by the sensor 110.

The dry-bulb temperature is a concept corresponding to a wet-bulb temperature and refers to a current temperature. The relative humidity refers to a pressure of a vapor included in the air at a specific temperature divided by a pressure of a saturated vapor at that temperature as follows:

$$RH = \frac{p(H_2O)}{p*(H_2O)} \times 100\%$$

Herein, RH is relative humidity, $p(H_2O)$ is a pressure of a vapor included in the drawn-in air, and $p*(H_2O)$ is a pressure of a saturated vapor at the temperature of the drawn-in air.

The absolute humidity is a weight ratio (kg/kgDA) between moisture included in wet air and dry air. The absolute humidity is a ratio (SH) of the weight of moisture included in wet air ($m_w$) to the weight of dry air ($m_{DA}$), and is expressed as follows:

$$SH(kg/kgDA) = \frac{m_w}{m_{DA}}$$

In addition, the processor 130 may calculate temperature and humidity information of discharge air discharged from the air conditioning device 100 on the basis of the information sensed by the sensor 110, that is, the driving frequency of the refrigerant compressor, the indoor dry-bulb temperature, and an indoor air volume correction value out of the driving state of the air conditioning device 100 and the ambient air information of the air conditioning device 100, and may calculate absolute humidity of the discharged air on the basis of the calculated temperature and humidity information.

The processor 130 may calculate the amount of dehumidification on the basis of the calculated absolute humidity of the drawn-in air and the absolute humidity of the discharged air.

The display 120 may be implemented by using various types of displays such as a liquid crystal display, an organic light emitting diode, or the like, but is not limited to these.

In addition, the display 120 may be implemented by using a touch screen. Accordingly, the display 120 may display various GUI items for controlling the air conditioning device 100 and a touch signal inputted through the touch screen may be forwarded to the processor 130 to control the air conditioning device 100.

The display 120 may display various screens. Herein, the screen may include a driving state information screen of the air conditioning device 100, an indoor air information screen, a screen related to a control command inputted by a user, a screen related to an amount of dehumidification calculated by the processor 130, or the like. However, this should not be considered as limiting.

FIG. 1C is a block diagram showing a detailed configuration of the air conditioning device 100 shown in FIG. 1B. Referring to FIG. 1C, the air conditioning device 100 includes a sensor 110, a display 120, a processor 130, a storage 140, and a refrigerant compressor 150.

The storage 140 stores an operating system (O/S) for driving the air conditioning device 100, firmware, or the like. In particular, the storage 140 stores data regarding an indoor air volume correction value. Accordingly, in response to the sensor 110 sensing indoor air volume information, the processor 130 may acquire an indoor air volume correction value corresponding to the sensed indoor air volume information from the storage 140.

The processor 130 may calculate a dry-bulb temperature and relative humidity information of discharged air on the basis of the acquired indoor air volume correction value, driving frequency information of the refrigerant compressor 150, and indoor temperature information of a place where the air conditioning device 100 is placed. Herein, the processor 130 may calculate absolute humidity of the discharged air on the basis of the dry-bulb temperature of the discharged air and the relative humidity of the discharged air.

In calculating the absolute humidity on the basis of the dry-bulb temperature and the relative humidity of the discharged air, the following equation may be normally used:

$$\text{absolute humidity} = 0.62198 \times \frac{\text{vapor pressure}}{\text{atmospheric pressure} - \text{vapor pressure}}$$

Herein, the vapor pressure may be calculated by multiplying a pressure of a saturated vapor at the temperature of the discharged air and the relative humidity of the discharged air.

The processor 130 may calculate absolute humidity of drawn-in air on the basis of ambient air information sensed by the sensor 110, and may calculate an amount of dehumidification on the basis of the calculated absolute humidity of the drawn-in air and the absolute humidity of the discharged air.

The processor 130 may calculate an amount of dehumidification through the following equation:

$$\text{amount of dehumidification (kg/h)} = (X1 - X2) * \text{mass flow rate(kg/h)}$$

Herein, X1 (kg/kgDA) is absolute humidity of drawn-in air and X2 (kg/kgDA) is absolute humidity of discharged air.

The flow rate refers to the volume, mass, or weight of fluid which passes through a cross section of a predetermined area in the flow of fluid, represented as a rate per unit time. Accordingly, the mass flow rate refers to a weight of air flowing during unit time. The unit of the mass flow rate is kg/h.

In addition, in response to the driving frequency of the refrigerant compressor 150 being greater than or equal to a predetermined value, the processor 130 may calculate the amount of dehumidification using a pre-stored constant value as the relative humidity information of the discharged air. That is, in response to the driving frequency of the refrigerant compressor 150 being greater than or equal to the predetermined value, the processor 130 may calculate the dry-bulb temperature of the discharged air and then calculate the absolute humidity of the discharged air on the basis of the calculated dry-bulb temperature of the discharged air and the pre-stored constant value. The processor 130 may calculate the amount of dehumidification of the air conditioning device on the basis of the absolute humidity of the drawn-in air and the absolute humidity of the discharged air.

In addition, the processor 130 may provide at least one of an instantaneous amount of dehumidification based on the calculated amount of dehumidification and a cumulative amount of dehumidification obtained by accumulating the instantaneous amounts of dehumidification through the display.

That is, the instantaneous amount of dehumidification based on the calculated amount of dehumidification refers to an amount of dehumidification performed during a predetermined time. The cumulative amount of dehumidification, which is the total amount of dehumidification since the air conditioning device has been driven, and is obtained by accumulating the amounts of dehumidification performed during a predetermined time, may be provided through the display.

The compressor 150 may receive a refrigerant in a low-pressure and low-temperature state, and may compress the refrigerant to make it in a high-pressure and high-temperature state and transmit the refrigerant to a condenser. The refrigerant compressor 150 is accompanied by strong vibration when it is driven and such vibration vibrates the other parts provided in the air conditioning device 100. The sensor 110 may measure the driving frequency of the refrigerant compressor 150 and transmit the driving frequency to the processor 130, and the processor 130 may calculate the dry-bulb temperature and the relative humidity information of the discharged air on the basis of the driving frequency of the refrigerant compressor 150.

Figure 2:
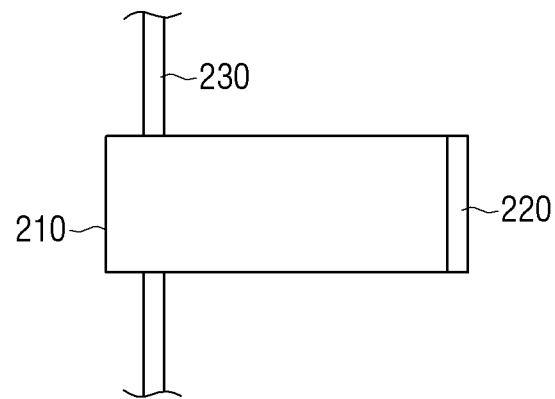
FIG. 2 is a view showing an implementation example of a related-art technology for measuring an amount of dehumidification of a dehumidifier.

FIG. 2 is a view showing an implementation example of a related-art method for measuring an amount of dehumidification of a dehumidifier.

Referring to FIG. 2, the related-art dehumidifier is provided with a separate water tank 210 and a separate dehumidification measurement sensor 220 disposed on a drain 230 to measure an amount of dehumidification. Accordingly, the water tank 210 is installed on the drain to contain condensate water, and the separate dehumidification measurement sensor 220 is installed in the water tank 210. The dehumidification measurement sensor 220 may measure an amount of dehumidification by sensing an amount of condensate water contained in the water tank 210. However, a space is required to have the separate water tank 210 formed therein, and there is a problem that the condensate water is contaminated and smells bad. In addition, in response to there having already been condensate water in the water tank 210 when the dehumidifier is driven, the dehumidification measurement sensor 220 may not exactly measure a cumulative amount of dehumidification.

Figure 3:
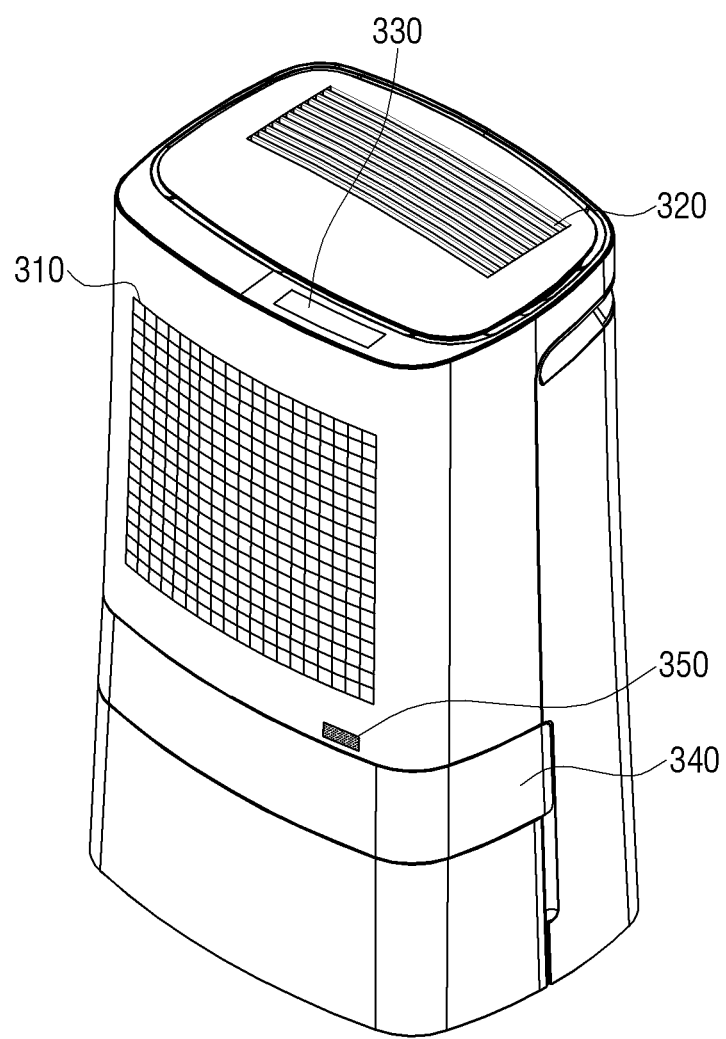
FIG. 3 is a view showing an implementation example of a dehumidifier according to an exemplary embodiment.

FIG. 3 is a view showing an implementation example of a dehumidifier according to an exemplary embodiment.

Referring to FIG. 3, the dehumidifier draws in indoor air of a place where the dehumidifier is placed through a suction portion 310. The air drawn in through the suction portion 310 has moisture reduced while passing through an evaporator, a condenser, and an air circulation fan. The dehumidifier discharges air having reduced moisture through a discharge portion 320.

The display 330 may include a touch screen and display current humidity, user set humidity, or the like, and may be provided with a user interface (UI) displaying a plurality of buttons for user's input. In particular, the display 330 may display an amount of dehumidification calculated in the processor 130.

A water tank 340 is mounted in the dehumidifier to collect condensate water. However, the water tank 340 may not be provided according to the air conditioning device 100. For example, when the air conditioning device 100 is implemented by using an air conditioner, the condensate water may not be contained in the water tank 340 and may be discharged to the outside.

A sensor 350 may be provided at one side of the dehumidifier to sense information of indoor air of a place where the dehumidifier is placed. In FIG. 3, the sensor 350 may sense relative humidity, dry-bulb temperature, and an air volume of indoor air. In addition, the sensor may be provided on the periphery of the suction portion 310 of the dehumidifier to sense relative humidity and a dry-bulb temperature of drawn-in air of the dehumidifier. In addition, the sensor 350 may sense a driving state of the dehumidifier. In addition, one sensor 350 is illustrated in FIG. 3, but the dehumidifier may include a plurality of sensors 350. The sensor 350 may be implemented as two or more sensors 350 according to a purpose. For example, a first sensor may be provided on the exterior of the dehumidifier to sense indoor air volume information, and a second sensor may be provided inside the suction portion 310 to sense the relative humidity and the dry-bulb temperature of the drawn-in air.

The information sensed by the sensor 350 may be transmitted to the processor 130. In response to the sensor 350 sensing the driving state of the dehumidifier and the ambient air information of the dehumidifier and transmitting the sensed information to the processor 130, the processor 130 may calculate temperature and humidity information of air discharged from the discharge portion 320 on the basis of the sensed information. In addition, the processor 130 may calculate absolute humidity of the discharged air on the basis of the temperature and humidity information of the discharged air. In addition, the processor 130 may calculate absolute humidity of the drawn-in air on the basis of the relative humidity and the dry-bulb temperature of the drawn-in air which are transmitted from the sensor 350. The processor 130 may calculate an amount of dehumidification on the basis of the absolute humidity of the drawn-in air and the absolute humidity of the discharged air. The calculated amount of dehumidification may be displayed through the display 330.

The sensor 350 may sense driving frequency information of the refrigerant compressor 150. In addition, the driving frequency information of the refrigerant compressor 150 may be acquired by the processor 150. The processor 130 may calculate the temperature and humidity information of the air discharged from the discharge portion 320 on the basis of the relative temperature and the dry-bulb temperature of the drawn-in air and the driving frequency information of the refrigerant compressor 150, which are transmitted from the sensor 350. In addition, the processor 130 may calculate the absolute humidity of the discharged air on the basis of the temperature and humidity information of the discharged air. In addition, the processor 130 may calculate the amount of dehumidification on the basis of the absolute humidity of the drawn-in air and the absolute humidity of the discharged air.

In addition, the sensor 350 may sense indoor air volume information of the place where the dehumidifier is placed, and may transmit the same to the processor 130. The processor 130 may acquire, from the storage 140, an indoor air volume correction value corresponding to the indoor air volume information transmitted from the sensor 130. The processor 130 may calculate the absolute humidity of the drawn-in air on the basis of the relative humidity of the drawn-in air and the dry-bulb temperature of the drawn-in air, which are sensed by the sensor 350. In addition, the processor 130 may calculate a discharge dry-bulb temperature and discharge relative humidity on the basis of an indoor temperature of the drawn-in air, the indoor air volume correction value, and the driving frequency of the refrigerant compressor 150. The processor 130 may calculate the discharge dry-bulb temperature and the discharge relative humidity using the following equations:

discharge dry-bulb temperature=$C1+C2$*dry-bulb temperature of drawn-in air+$C3$*driving frequency of refrigerant compressor+$C4$*indoor air volume correction value discharge relative humidity=$A1+A2$*dry-bulb temperature of drawn-in air+$A3$*driving frequency of refrigerant compressor+$A4$*indoor air volume correction value Herein, C1 to C4 are constant values and are selected through experimental data. In addition, A1 to A4 are also constant values and are selected through experimental data. Since the driving frequency of the refrigerant compressor 150 normally has a unit of Hz, the discharge dry-bulb temperature and the discharge relative humidity are calculated by applying values other than the unit to the driving frequency of the refrigerant compressor 150 in the above-described equations.

The processor 130 may calculate the absolute humidity of the discharged air on the basis of the discharge dry-bulb temperature and the discharge relative humidity.

In addition, the processor 130 may calculate the amount of dehumidification using the following equation on the basis of the absolute humidity of the drawn-in air and the absolute humidity of the discharged air:

amount of dehumidification (kg/h)=$(X1-X2)$*mass flow rate

Herein, X1 (kg/kgDA) is absolute humidity of drawn-in air, and X2 (kg/kgDA) is absolute humidity of discharged air. The mass flow rate refers to a weight of air flowing during unit time.

The flow rate refers to the volume, mass, or weight of fluid which passes through a cross section of a predetermined area in the flow of fluid, represented as a rate per unit time. Accordingly, the mass flow rate refers to a weight of air flowing during unit time. The unit of the mass flow rate is kg/h.

The amount of dehumidification is calculated as the unit of kg/h in the above-described equation, but the processor 130 may convert the calculated amount of dehumidification into ℓ/h and may provide the calculated amount of dehumidification to the display 330.

Figure 4A:
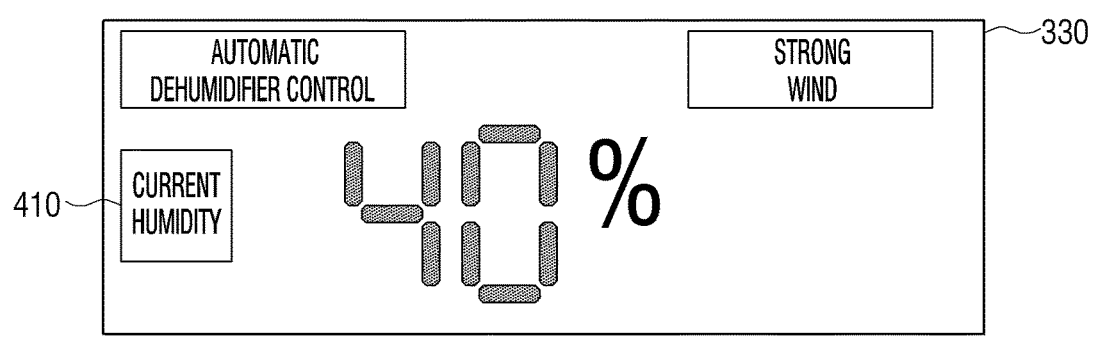
FIGS. 4A to 4C are views showing an implementation example of display of an amount of dehumidification according to an exemplary embodiment.
Figure 4B:
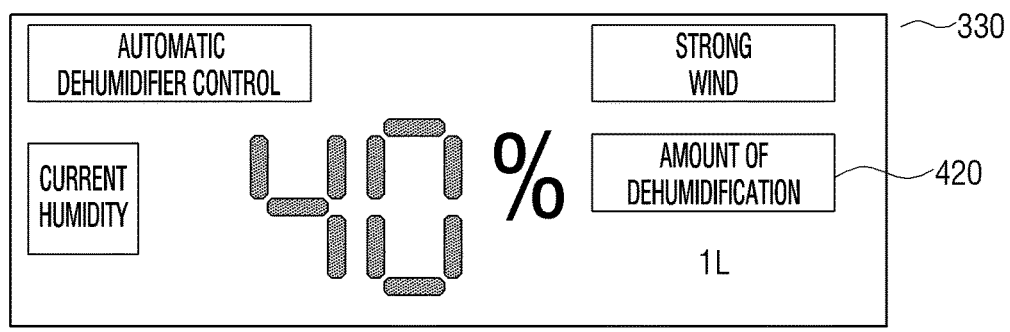
Figure 4C:
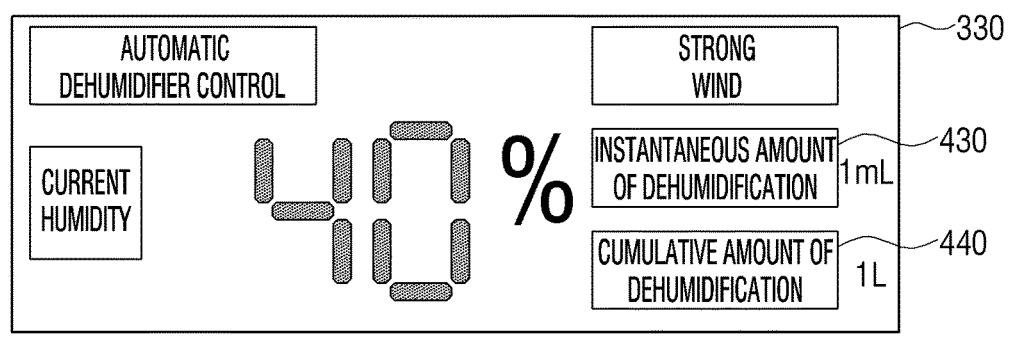

FIGS. 4A to 4C are views showing implementation examples of a dehumidification display according to an exemplary embodiment.

Referring to FIG. 4A, a related-art dehumidifier provides current humidity 410 through a display 330. Accordingly, the related-art dehumidifier may display only the relative humidity of indoor air of a place where the dehumidifier is placed, and additionally, may display user set humidity, an air volume, or the like.

Referring to FIG. 4B, the display 330 of the dehumidifier according to an exemplary embodiment provides a specific amount of dehumidification 420. Accordingly, the display 330 of the dehumidifier may additionally provide the amount of dehumidification in addition to the relative humidity of indoor air and the user set humidity which are provided by the related-art dehumidifier.

Referring to FIG. 4C, the display 330 may display at least one of an instantaneous amount of dehumidification 430 and a cumulative amount of dehumidification 440.

Amounts of dehumidification which have been accumulated from the time that the dehumidifier was driven until the time when the amount of dehumidification is checked may be displayed on the cumulative amount of dehumidification 440, and an amount of dehumidification at the time that the amount of dehumidification is checked may be displayed on the instantaneous amount of dehumidification 430. The amount of dehumidification calculated by the processor 130 may be the instantaneous amount of dehumidification. Specifically, the instantaneous amount of dehumidification may be an amount of moisture which is removed by the dehumidifier during a predetermined time. Accordingly, the processor 130 may calculate the cumulative amount of dehumidification by accumulating the instantaneous amounts of dehumidification. FIG. 4C illustrates an implementation example of a dehumidification display according to an exemplary embodiment, and the processor 130 may control at least one of the instantaneous amount of dehumidification and the cumulative amount of dehumidification to be displayed.

In addition, in response to the instantaneous amount of dehumidification or the cumulative amount of dehumidification exceeding or being less than a predetermined amount of dehumidification, the dehumidifier may be set to control the processor 130 to control the driving state of the dehumidifier.

For example, the processor 130 may be controlled to display only in response to the cumulative amount of dehumidification reaching the predetermined amount of dehumidification. In addition, in response to the cumulative amount of dehumidification exceeding the predetermined amount of dehumidification, the processor 130 may control the air volume of the dehumidifier to be reduced. The processor 130 may control the air volume of the dehumidifier to increase in response to the instantaneous amount of dehumidification being less than the predetermined amount of dehumidification.

Figure 5:
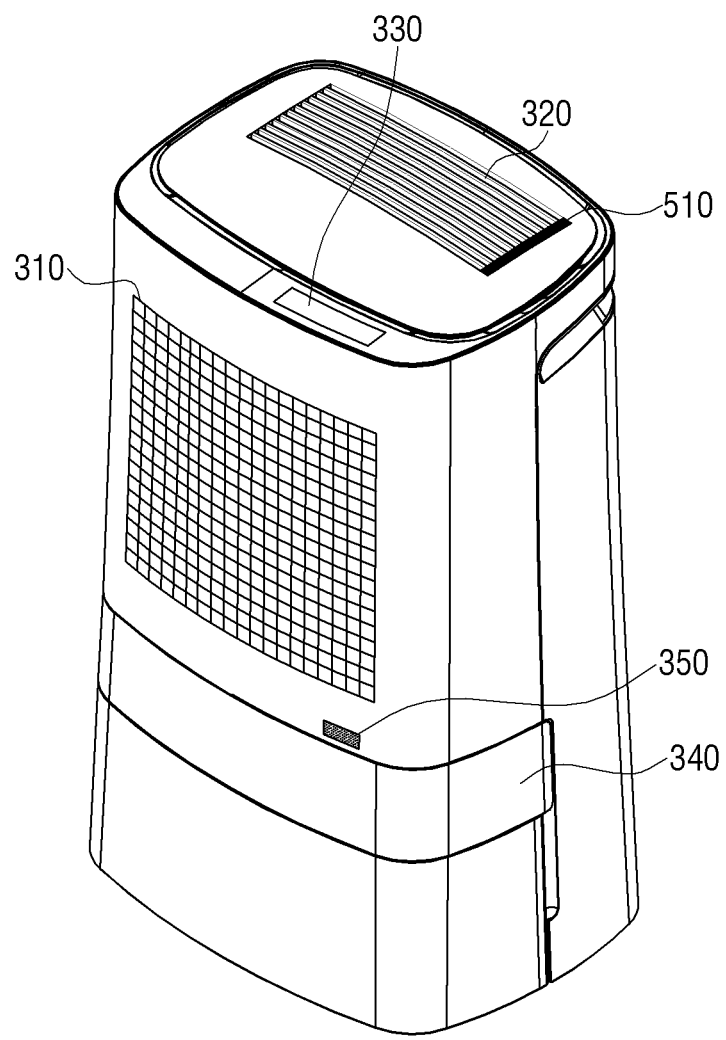
FIG. 5 is a view showing an implementation example of a dehumidifier according to an exemplary embodiment.

FIG. 5 is a view showing an implementation example of the dehumidifier according to an exemplary embodiment.

Referring to FIG. 5, the dehumidifier may include a sensor 510 disposed on the discharge portion 320 to sense discharged air, in addition to the sensor 350 for sensing ambient air information of a place where the dehumidifier is placed.

The discharged air information measurement sensor 510 may be disposed on the exterior of the dehumidifier or on the periphery of the discharge portion 320, or may be disposed inside the discharge portion 320. The discharged air information measurement sensor 510 may sense information regarding air discharged through the discharge portion 320. Specifically, the discharged air information measurement sensor 510 may sense a dry-bulb temperature, a wet-bulb temperature, and relative humidity of the discharged air. The discharged air information measurement sensor 510 may integrally or individually include an air temperature sensor (not shown) to sense the temperature of air discharged to the outside, or a humidity sensor (not shown) to sense humidity of the discharged air.

However, this should not be considered as limiting. The discharged air information measurement sensor 510 may include various sensors to sense a variety of information such as an air volume, a wind velocity, or the like of the discharged air.

The discharged air information measurement sensor 510 may transmit the sensed discharged air information to the processor 130. The processor 130 may calculate absolute humidity of the discharged air on the basis of the discharged air information. The processor 130 may calculate an amount of dehumidification on the basis of the absolute humidity of the discharged air and the ambient air information sensed by the sensor 350.

In FIG. 5, only one discharged air information measurement sensor 510 is illustrated, but a plurality of sensors may be provided. For example, a first discharged air information measurement sensor may measure a dry-bulb temperature of the discharged air, and a second discharged air information measurement sensor may measure a wet-bulb temperature of the discharged air. However, this should not be considered limiting, and the second discharged air information measurement sensor may measure relative humidity of the discharged air and transmit the relative humidity of the discharged air to the processor 130. The discharged air information measurement sensor 510 may include the plurality of sensors which are disposed at different locations. That is, the first discharged air information measurement sensor may be disposed on the periphery of the discharge portion 320, and the second discharged air information measurement sensor may be disposed inside the discharge portion 320.

Figure 6:
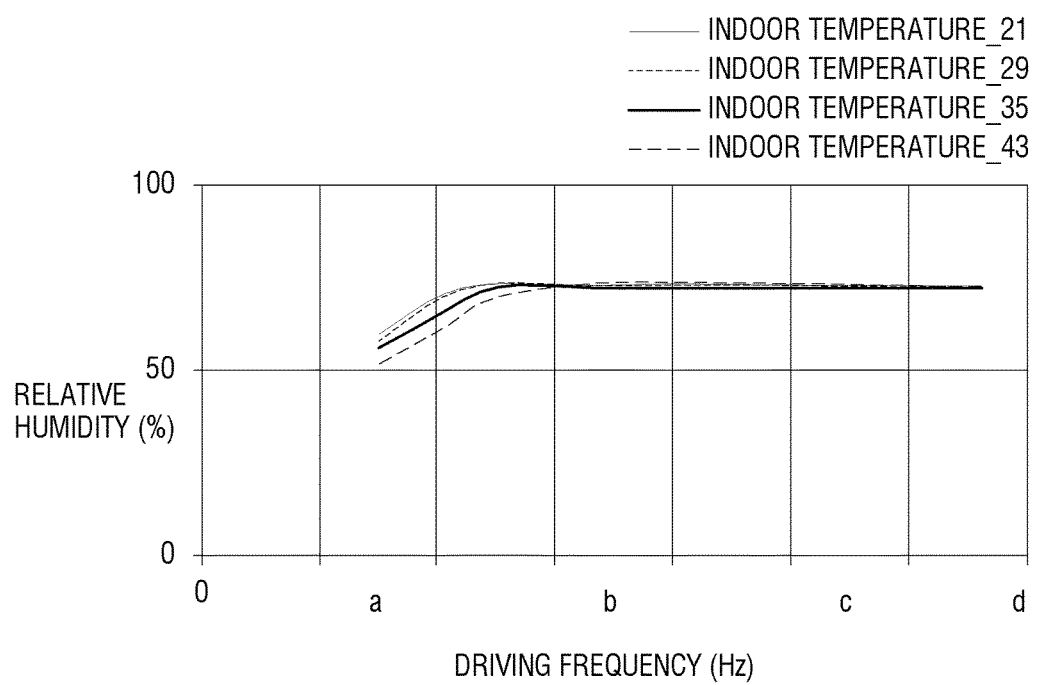
FIG. 6 is a graph showing a change in relative humidity of discharged air according to a driving frequency of a refrigerant compressor of a dehumidifier according to an exemplary embodiment.

FIG. 6 is a graph showing a change in relative humidity of discharged air according to a driving frequency of the refrigerant compressor 150 according to an exemplary embodiment. The graph of FIG. 6 shows a change of relative humidity (%) of discharged air according to a change in a driving frequency (Hz), as data obtained through an experiment. Referring to FIG. 6, it can be seen that, in response to the driving frequency being b, c, or d (Hz), the relative humidity (%) of the discharged air is not greatly changed regardless of an indoor temperature. In addition, it can be seen that, in response to the driving frequency being a (Hz), the relative humidity (%) of the discharged air is greatly changed regardless of an indoor temperature. Accordingly, in a section in which the change in the relative humidity of the discharged air is constantly maintained within a predetermined percentage (%), the processor 130 may not calculate the relative humidity of the discharged air and may use a constant value. Accordingly, the storage 140 may store data regarding the driving frequency of the refrigerant compressor 150 and the relative humidity information of the discharged air in the section in which the relative humidity of the discharged air is constant according to the driving frequency of the refrigerant compressor 150 regardless of the indoor temperature. In addition, in response to the driving frequency of the refrigerant compressor 150 being greater than or equal to a predetermined value, the processor 130 may calculate the absolute humidity of the discharged air using a pre-stored constant value as relative humidity of the discharged air.

For example, in response to a driving frequency (Hz) sensed by the sensor 110 corresponding to predetermined values b-d (Hz) of the driving frequency of FIG. 6, the processor 130 may acquire a pre-stored constant value from data stored in the storage 140 as relative humidity of discharged air. The processor 130 may calculate absolute humidity of the discharged air on the basis of the acquired constant value and a dry-bulb temperature of the discharged air.

Accordingly, only in response to the driving frequency (Hz) of the refrigerant compressor 150 being less than a predetermined value, the processor 130 may calculate relative humidity of the discharged air on the basis of ambient air information transmitted from the sensor 110.

Figure 7:
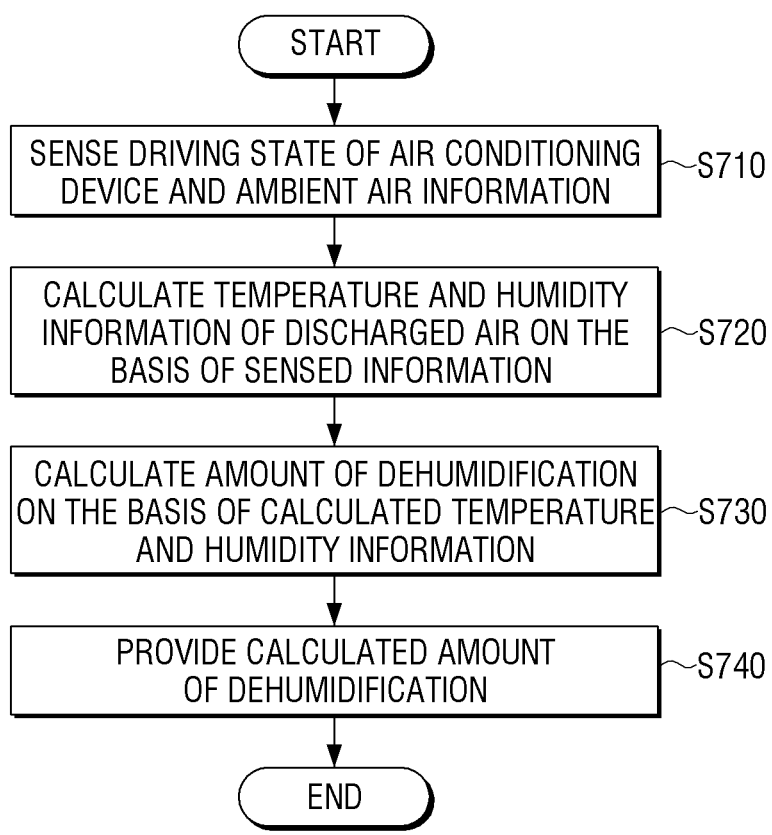
FIG. 7 is a flowchart showing a method for calculating an amount of dehumidification according to an exemplary embodiment.

FIG. 7 is a flowchart to illustrate a method for calculating an amount of dehumidification according to an exemplary embodiment.

According to the method for calculating an amount of dehumidification as shown in FIG. 7, a driving state and ambient air information of the air conditioning device are sensed (S710).

Next, temperature and humidity information of discharged air is calculated on the basis of the sensed information (S720).

In addition, an amount of dehumidification is calculated on the basis of the calculated temperature and humidity information (S730), and the calculated amount of dehumidification is provided (S740).

The method for calculating an amount of dehumidification further includes drawing air into the air conditioning device, and the step S730 of calculating the amount of dehumidification includes calculating absolute humidity of the drawn-in air on the basis of the sensed ambient air information, and calculating the amount of dehumidification on the basis of the calculated absolute humidity of the drawn-in air and the temperature and humidity information of the discharged air.

Herein, the driving state of the air conditioning device may include driving frequency information of a refrigerant compressor 150 provided in the air conditioning device, and the ambient air information may include indoor temperature information of a place where the air conditioning device is placed, and indoor air volume information of the place where the air conditioning device is placed.

In addition, the step S730 of calculating the amount of dehumidification may include acquiring an indoor air volume correction value corresponding to the indoor air volume information, and calculating a dry-bulb temperature and relative humidity information of the discharged air on the basis of the acquired indoor air volume correction value, the driving frequency information of the refrigerant compressor 150, and the indoor temperature information of the place where the air conditioning device is placed.

In addition, the step S730 of calculating the amount of dehumidification may include calculating the amount of dehumidification on the basis of the dry-bulb temperature of the discharged air, the relative humidity of the discharged air, and the absolute humidity of the drawn-in air.

In addition, the step S730 of calculating the amount of dehumidification includes calculating the amount of dehumidification on the basis of the following equation:

$$\text{amount of dehumidification} = (X1 - X2) * \text{mass flow rate}$$

where X1 (kg/kgDA) is absolute humidity of drawn-in air and X2 (kg/kgDA) is absolute humidity of discharged air.

The flow rate refers to the volume, mass, or weight of fluid which passes through a cross section of a predetermined area in the flow of fluid, represented as a rate per unit time. Accordingly, the mass flow rate refers to a weight of air flowing during unit time. The unit of the mass flow rate is kg/h.

In addition, the step S730 of calculating the amount of dehumidification includes, in response to the driving frequency of the refrigerant compressor being greater than or equal to a predetermined value, calculating the amount of dehumidification by using a pre-stored constant value as the relative humidity information of the discharged air.

The step S740 of providing the calculated amount of dehumidification includes providing at least one of an instantaneous amount of dehumidification based on the calculated amount of dehumidification and a cumulative amount of dehumidification acquired by accumulating the instantaneous amounts of dehumidification.

FIG. 8 is a flowchart to illustrate a method for calculating an amount of dehumidification according to an exemplary embodiment.

As shown in FIG. 8, according to the method for calculating an amount of dehumidification according to an exemplary embodiment, a driving frequency of the refrigerant compressor 150 and an indoor temperature and an indoor air volume of the air conditioning device may be sensed (S810). Next, an indoor air volume correction value may be acquired by correcting the indoor air volume value (S820). Next, absolute humidity of drawn-in air is calculated on the basis of a sensing value (S830). Next, a discharge dry-bulb temperature is calculated on the basis of the driving frequency of the refrigerant compressor 150 and the indoor temperature and the indoor air volume of the air conditioning device (S840). In response to the driving frequency of the refrigerant compressor 150 being greater than or equal to a predetermined driving frequency value (S850:Y), a predetermined constant value is used as discharge relative humidity (S860). Next, absolute humidity of discharged air is calculated by using the discharge dry-bulb temperature and the discharge relative humidity (S870). Next, an amount of dehumidification is calculated on the basis of the absolute humidity of the drawn-in air and the absolute humidity of the discharged air and is provided (S880).

On the other hand, in response to the driving frequency of the refrigerant compressor 150 not being greater than or equal to the predetermined driving frequency value (S850:N), the discharge relative humidity is calculated on the basis of the driving frequency of the refrigerant compressor 150 and the indoor temperature and the indoor air volume of the air conditioning device (S890). Next, the absolute humidity of the discharged air is calculated on the basis of the discharge dry-bulb temperature and the discharge relative humidity (S870). Next, the amount of dehumidification is calculated on the basis of the absolute humidity of the drawn-in air and the absolute humidity of the discharged air and is provided (S880).

According to various exemplary embodiments, the air conditioning device can calculate a specific amount of dehumidification through a predetermined algorithm and display it, and does not require a separate space to contain condensate water. Accordingly, since the volume of the air conditioning device is reduced and a cost is reduced, user's convenience can be enhanced.

The methods according to the above-described various exemplary embodiments may be implemented by simply upgrading software of a related-art air conditioning device.

In addition, the above-described various exemplary embodiments may be implemented through an embedded server provided in the air conditioning device or an external server of the air conditioning device.

In addition, a non-transitory computer readable medium which stores a program for performing the method for calculating an amount of dehumidification according to the present disclosure in sequence may be provided.

For example, a non-transitory computer readable medium which stores a program for performing the steps of: calculating temperature and humidity information of discharged air on the basis of a driving state of the air conditioning device and ambient air information of the air conditioning device; and calculating an amount of dehumidification on the basis of the calculated temperature and humidity information may be provided.

The non-transitory computer readable medium refers to a medium that stores data semi-permanently rather than storing data for a very short time, such as a register, a cache, a memory or etc., and is readable by an apparatus. Specifically, the above-described various applications or programs may be stored in the non-transitory computer readable medium such as a compact disc (CD), a digital versatile disk (DVD), a hard disk, a Blu-ray disk, a universal serial bus (USB), a memory card, a ROM or etc., and may be provided While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

What is claimed is:

1. An air conditioning device comprising:
   an input port;
   a refrigerant compressor;
   an output port;
   a display;
   a sensor; and
   a processor configured to,
   based on air being drawn through the input port, obtain an absolute humidity of the drawn air based on ambient air information of the air conditioning device obtained through the sensor, control the refrigerant compressor to operate so that the drawn air is dehumidified, discharge the dehumidified air through the output port, based on a driving frequency of the refrigerant compressor sensed through the sensor being greater than a predetermined driving frequency, obtain an absolute humidity of the discharged air in accordance with a constant value as a relative humidity of the discharged air and a temperature of the discharged air sensed through the sensor, based on the sensed driving frequency being less than the predetermined driving frequency, obtain the relative humidity of the discharged air in accordance with the sensed driving frequency, and obtain the absolute humidity of the discharged air in accordance with the obtained relative humidity and the temperature of the discharged air, obtain an amount of dehumidification based on the absolute humidity of the drawn air and the absolute humidity of the discharged air, and control the display to display the obtained amount of dehumidification.

2. The air conditioning device of claim 1, further comprising:

a storage storing to store data related to an indoor air volume correction value, wherein the temperature of the discharged air is a dry-bulb temperature of the discharged air, the ambient air information comprises an indoor temperature of a place where the air conditioning device is positioned and indoor air volume information of the place, and the processor is configured to acquire, from the storage, an indoor air volume correction value corresponding to the indoor air volume information, and to obtain the dry-bulb temperature of the discharged air in accordance with the acquired indoor air volume correction value, the sensed driving frequency, and the indoor temperature.

3. The air conditioning device of claim 1, wherein the temperature is a dry-bulb temperature of the discharged air.

4. The air conditioning device of claim 1, wherein the processor is configured to obtain the amount of dehumidification in accordance with the following equation:

amount of dehumidification=$(X1-X2)$*mass flow rate where X1 (kg/kgDA) is the absolute humidity of the air drawn into the air conditioning device and X2 (kg/kgDA) is the absolute humidity of discharged air.

5. The air conditioning device of claim 1, wherein the processor is configured to obtain at least one of an instantaneous amount of dehumidification in accordance with the obtained amount of dehumidification and a cumulative amount of dehumidification acquired by accumulating the instantaneous amounts of dehumidification, and control the display to display the at least one of the instantaneous amount of dehumidification and the cumulative amount of dehumidification.

6. A method comprising:

by an air conditioning device, drawing air into the air conditioning device;

obtaining an absolute humidity of the drawn air based on ambient air information of the air conditioning device;

operating a refrigerant compressor of the air conditioning device so that the drawn air is dehumidified;

discharging the dehumidified air from the air conditioning device;

sensing a driving frequency of the refrigerant compressor;

based on the sensed driving frequency being greater than a predetermined driving frequency, obtaining an absolute humidity of the discharged air in accordance with a constant value as a relative humidity of the discharged air and a temperature of the discharged air;

based on the sensed driving frequency being less than the predetermined driving frequency, obtaining the relative humidity of the discharged air in accordance with the sensed driving frequency, and obtaining the absolute humidity of the discharged air in accordance with the obtained relative humidity and the temperature of the discharged air;

obtaining an amount of dehumidification based on the absolute humidity of the drawn air and the absolute humidity of the discharged air; and displaying the obtained amount of dehumidification.

7. The method of claim 6, wherein the temperature of the discharged air is a dry-bulb temperature of the discharged air, the ambient air information comprises an indoor temperature of a place where the air conditioning device is positioned and indoor air volume information of the place, and the method further comprising:

by the air conditioning device, acquiring an indoor air volume correction value corresponding to the indoor air volume information, and obtaining the dry-bulb temperature of the discharged air in accordance with the acquired indoor air volume correction value, the sensed driving frequency, and the indoor temperature.

8. The method of claim 6, wherein the temperature is a dry-bulb temperature of the discharged air.

9. The method of claim 6, wherein the obtaining the amount of dehumidification comprises calculating the amount of dehumidification in accordance with the following equation:

amount of dehumidification=$(X1-X2)$*mass flow rate where X1 (kg/kgDA) is the absolute humidity of the air drawn into the air conditioning device and X2 (kg/kgDA) is the absolute humidity of discharged air.

10. The method of claim 6, further comprising:

by the air conditioning device, calculating at least one of an instantaneous amount of dehumidification in accordance with the obtained amount of dehumidification and a cumulative amount of dehumidification acquired by accumulating the instantaneous amounts of dehumidification; and displaying, on the display, the at least one of the instantaneous amount of dehumidification and the cumulative amount of dehumidification.

* * * * *